United States Patent
Le

(10) Patent No.: US 7,875,388 B2
(45) Date of Patent: Jan. 25, 2011

(54) ELECTRODES INCLUDING POLYACRYLATE BINDERS AND METHODS OF MAKING AND USING THE SAME

(75) Inventor: Dinh Ba Le, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 892 days.

(21) Appl. No.: 11/671,601

(22) Filed: Feb. 6, 2007

(65) Prior Publication Data

US 2008/0187838 A1 Aug. 7, 2008

(51) Int. Cl.
*H01M 4/62* (2006.01)
(52) U.S. Cl. .................. 429/217; 429/218.1; 429/212; 252/182.1
(58) Field of Classification Search .............. 429/217, 429/212, 231.8, 231.95, 218.1; 252/182.1
See application file for complete search history.

(56) References Cited

U.S. PATENT DOCUMENTS

| | | | |
|---|---|---|---|
| 5,032,628 A * | 7/1991 | Choi et al. ............. | 523/409 |
| 5,536,599 A | 7/1996 | Alamgir et al. | |
| 5,709,968 A | 1/1998 | Shimizu | |
| 5,763,119 A | 6/1998 | Adachi | |
| 5,858,573 A | 1/1999 | Abraham et al. | |
| 5,882,812 A | 3/1999 | Visco et al. | |
| 5,976,731 A | 11/1999 | Negoro et al. | |
| 6,004,698 A | 12/1999 | Richardson et al. | |
| 6,045,952 A | 4/2000 | Kerr et al. | |
| 6,071,489 A | 6/2000 | Sun et al. | |
| 6,203,944 B1 | 3/2001 | Turner et al. | |
| 6,235,427 B1 | 5/2001 | Idota et al. | |
| 6,255,017 B1 | 7/2001 | Turner | |
| 6,387,570 B1 | 5/2002 | Nakamura et al. | |
| 6,387,571 B1 | 5/2002 | Lain et al. | |
| 6,436,578 B2 | 8/2002 | Turner et al. | |
| 6,680,145 B2 | 1/2004 | Obrovac et al. | |
| 6,780,544 B2 | 8/2004 | Noh | |
| 6,790,563 B2 | 9/2004 | Ishii et al. | |
| 6,964,828 B2 | 11/2005 | Lu et al. | |
| 7,078,128 B2 | 7/2006 | Lu et al. | |
| 2003/0211390 A1 | 11/2003 | Dahn et al. | |
| 2004/0005824 A1 | 1/2004 | Zeiger | |
| 2005/0031957 A1 | 2/2005 | Christensen et al. | |
| 2005/0221168 A1 | 10/2005 | Dahn et al. | |
| 2005/0221196 A1 | 10/2005 | Dahn et al. | |
| 2006/0046144 A1 | 3/2006 | Obrovac | |
| 2006/0240323 A1 | 10/2006 | Tomihara et al. | |
| 2006/0263696 A1 | 11/2006 | Kim et al. | |
| 2006/0263697 A1 | 11/2006 | Dahn et al. | |
| 2007/0020521 A1 | 1/2007 | Obrovac et al. | |
| 2007/0020522 A1 | 1/2007 | Obrovac et al. | |
| 2007/0020528 A1 | 1/2007 | Obrovac et al. | |
| 2007/0026313 A1 | 2/2007 | Sano | |
| 2007/0092796 A1 | 4/2007 | Matsuda et al. | |

FOREIGN PATENT DOCUMENTS

| | | |
|---|---|---|
| EP | 0 867 955 (B1) | 9/1998 |
| EP | 1 734 600 (A1) | 12/2006 |
| JP | 2000-348730 | 12/2000 |
| JP | 2001-250536 | 9/2001 |
| JP | 2001/283859 | 10/2001 |
| JP | 2002-050360 | 2/2002 |
| JP | 2003-282147 | 10/2003 |
| JP | 2004-214046 | 7/2004 |
| JP | 2005-216502 | 8/2005 |
| JP | 2006-032296 * | 2/2006 |
| JP | 2006/210208 | 8/2006 |
| JP | 2006-210208 | 8/2006 |
| JP | 2007-134108 | 5/2007 |
| WO | WO2004/049475 | 6/2004 |
| WO | WO2007/044315 | 4/2007 |
| WO | WO 2007/069389 | 6/2007 |

OTHER PUBLICATIONS

U.S. Appl. No. 11/419,564 (Krause et al.) filed May 22, 2006 entitled "Electrode Composition, Method of Making the Same, and Lithium Ion Battery Including the Same".

U.S. Appl. No. 11/562,227 (Christensen et al) filed Nov. 21, 2006 entitled "Electrode Compositions Based on an Amorphous Alloy Having a High Silicon Content".

* cited by examiner

*Primary Examiner*—Raymond Alejandro
(74) *Attorney, Agent, or Firm*—Jean A. Lown; Stephen F. Wolf

(57) ABSTRACT

Provided is an electrode composition comprising a powdered material capable of undergoing lithiation and delithiation, and a non-elastomeric binder comprising lithium polyacrylate, along with methods of making and using the same, as well as electrochemical cells incorporating the same.

13 Claims, No Drawings

ELECTRODES INCLUDING POLYACRYLATE BINDERS AND METHODS OF MAKING AND USING THE SAME

FIELD OF THE INVENTION

This invention relates to electrode binders for electrochemical cells and to electrodes containing such binders.

BACKGROUND

Powdered alloys of main group elements and conductive powders such as carbon black have been used to make electrodes for lithium-ion cells in a process that involves mixing the powdered active ingredients with a polymeric binder such as polyvinylidene fluoride. The mixed ingredients are prepared as a dispersion in a solvent for the polymeric binder, and coated onto a metal foil substrate, or current collector. The resulting composite electrode contains the powdered active ingredient in the binder, adhered to the metal substrate.

Many polymers such as polyvinylidene fluoride, aromatic and aliphatic polyimides and polyacrylates have been used as binders for metal and graphite based lithium-ion cell electrodes. However, the first cycle irreversible capacity loss in the resulting cells can be unacceptably large, e.g., as large as 300 mAh/g or more for an electrode based on a powdered metal material.

Secondary electrochemical cells, such as lithium-ion cells, are capable of being reversibly charged and discharged multiple times. In the case of lithium-ion batteries, the charging and the discharging of the lithium-ion electrochemical cells are accomplished by lithiating and delithiating the cell electrodes. When lithium-ion cells are constructed, they usually contain excess lithium-ions in the positive electrode and no lithium-ions in the negative electrode. During the initial cycling reaction of the cells (charging), lithium transfers from the positive electrode to the negative electrode until the negative electrode has reached its capacity of absorbing lithium-ions. Upon the first discharge, the lithium-ions migrate from the lithiated negative electrode back to the positive electrode. Typically, after the first charging not all of the lithium-ions in the negative electrode are able to migrate out of the negative electrode. This results in what is known as irreversible loss in the capacity of the cell. Loss in the capacity of a cell from additional cycling (after the first cycle) is called capacity fade. This can be for a variety of reasons including changes in the morphology of the active electrode material upon repeated cycling, a buildup of insulating layers on the active electrode material upon repeated cycling or other reasons. A desirable lithium-ion cell is one that has low irreversible capacity loss after the initial cycling, and has low capacity loss (fade) after multiple cycles.

SUMMARY

In view of the foregoing, we recognize that there is a need for electrodes that undergo reduced first cycle capacity loss (irreversible capacity loss) and reduced capacity fade.

In one aspect, this invention provides an electrode composition that comprises a powdered material capable of undergoing lithiation and delithiation. In addition, the electrode composition includes a non-elastomeric binder that includes lithium polyacrylate.

In another aspect, this invention provides an electrochemical cell that comprises a positive electrode, a negative electrode, and an electrolyte. The negative electrode, the positive electrode, or both electrodes include a powdered material capable of undergoing lithiation and delithiation and a non-elastomeric binder that includes lithium polyacrylate.

In yet a further aspect, this invention provides a method of making an electrochemical cell electrode that includes providing a current collector, providing a powdered material capable of undergoing lithiation and delithiation, and applying to the current collector a coating that includes the powdered material and lithium polyacrylate.

The use of lithium polyacrylate as a binder provides reduced irreversible capacity and fade. The irreversible first cycle capacity loss in these electrodes can be significantly decreased by forming the electrode using a lithium polyacrylate binder. Such a binder (which can be prepared by neutralizing poly(acrylic acid) with lithium hydroxide) can be used to prepare electrodes and cells that experience decreased first cycle irreversible capacity loss compared to electrodes or cells made with conventional polymeric binders.

The disclosed electrodes containing lithium polyacrylate binders can improve cycle life in rechargeable lithium-ion cells employing electrodes based on small particle alloy powders. The disclosed binders can also allow fabrication of rechargeable lithium-ion cells having improved capacities or employing novel alloy powders.

In this application:

the terms "a", "an", and "the" are used interchangeably with "at least one" to mean one or more of the elements being described;

the term "metal" refers to both metals and to metalloids such as silicon and germanium, whether in an elemental or ionic state;

the term "alloy" refers to a mixture of two or more metals;

the terms "lithiate" and "lithiation" refer to a process for adding lithium to an electrode material;

the terms "delithiate" and "delithiation" refer to a process for removing lithium from an electrode material;

the term "active" refers to a material that can undergo lithiation and delithiation;

the terms "charge" and "charging" refer to a process for providing electrochemical energy to a cell;

the terms "discharge" and "discharging" refer to a process for removing electrochemical energy from a cell, e.g., when using the cell to perform desired work;

the phrase "positive electrode" refers to an electrode (often called a cathode) where electrochemical reduction and lithiation occurs during a discharging process; and the phrase "negative electrode" refers to an electrode (often called an anode) where electrochemical oxidation and delithiation occurs during a discharging process.

Unless the context clearly requires otherwise, the terms "aliphatic", "cycloaliphatic" and "aromatic" include substituted and unsubstituted moieties containing only carbon and hydrogen, moieties that contain carbon, hydrogen and other atoms (e.g., nitrogen or oxygen ring atoms), and moieties that are substituted with atoms or groups that may contain carbon, hydrogen or other atoms (e.g., halogen atoms, alkyl groups, ester groups, ether groups, amide groups, hydroxyl groups or amine groups).

DETAILED DESCRIPTION

All numbers are herein assumed to be modified by the term "about". The recitation of numerical ranges by endpoints includes all numbers subsumed within that range (e.g., 1 to 5 includes 1, 1.5, 2, 2.75, 3, 3.80, 4, and 5).

Electrode compositions according to the present invention may be used in negative or positive electrodes. A variety of powdered materials can be employed to make the electrode compositions. Exemplary powdered materials can for example contain silicon, silver, lithium, tin, bismuth, lead, antimony, germanium, zinc, gold, platinum, palladium, arsenic, aluminum, gallium, indium, thallium, molybdenum, niobium, tungsten, tantalum, iron, copper, titanium, vanadium, chromium, nickel, cobalt, zirconium, yttrium, a lanthanide, an actinide or an alloy containing any of the foregoing metals or metalloids and other powdered active metals and metalloids that will be familiar to those skilled in the art. Graphitic carbon powder can also be used to make the disclosed electrode compositions. Exemplary powders can have a maximum length in one dimension that is no greater than 60 µm, no greater than 40 µm, or no greater than 20 µm, or even smaller. The powders can, for example, have a maximum particle diameter that is submicron, at least 1 µm, at least 2 µm, at least 5 µm, or at least 10 µm or even larger. For example, suitable powders often have a maximum dimension of 1 to 60 µm, 10 to 60 µm, 20 to 60 µm, 40 to 60 µm, 1 to 40 µm, 2 to 40 µm, 10 to 40 µm, 5 to 20 µm, or 10 to 20 µm. The powdered materials can contain optional matrix formers within powder particles. Each phase originally present in the particle (i.e., before a first lithiation) can be in contact with the other phases in the particle. For example, in particles based on a silicon:copper:silver alloy, a silicon phase can be in contact with both a copper silicide phase and a silver or silver alloy phase. Each phase in a particle can for example have a grain size less than 500 Å, less than 400 Å, less than 300 Å, less than 200 Å, less than 150 Å, or even smaller.

Exemplary silicon-containing powdered materials useful in this invention include the silicon alloys wherein the powdered material comprises from about 65 to about 85 mole percent silicon, from about 5 to about 12 mole percent iron, from about to about 12 mole percent titanium, and from about 5 to about 12 mole percent carbon. Additional examples of useful silicon alloys include compositions that include silicon, copper, and silver or silver alloy such as those discussed in U.S. Pat. Appl. Publ. No. 2006/0046144 A1 (Obrovac et al.); multiphase, silicon-containing electrodes such as those discussed in U.S. Pat. No. 7,498,100 (Christensen et al.); silicon alloys that contain tin, indium and a lanthanide, actinide element or yttrium such as those described in U.S. Pat. Publ. Nos. 2007/0020521, 2007/0020522, and 2007/0020528 (all to Obrovac et al.); amorphous alloys having a high silicon content such as those discussed in U.S. Pat. No. 7,732,095 (Christensen et al.); and other powdered materials used for negative electrodes such as those discussed in U.S. Pat. Publ. No. 2007/0269718 (Krause et al.) and PCT Publ. No. WO 2007/044315 (Krause et al.). Each of the foregoing references is incorporated herein in its entirety.

Other useful exemplary powdered materials for making positive electrodes of the invention include lithium alloys such as $Li_{4/3}Ti_{5/3}O_4$, $LiV_3O_8$, $LiV_2O_5$, $LiCo_{0.2}Ni_{0.8}O_2$, $LiNiO_2$, $LiFePO_4$, $LiMnPO_4$, $LiCoPO_4$, $LiMn_2O_4$, and $LiCoO_2$; lithium atoms intercalated within a lithium transition metal oxide such as lithium cobalt dioxide, lithium nickel dioxide, and lithium manganese dioxide; the lithium alloy compositions that include mixed metal oxides of cobalt, manganese, and nickel such as those described in U.S. Pat. Nos. 6,964,828 and 7,078128 (Lu et al); U.S. Pat. No. 6,203,944 (Turner); and U.S. Pat. No. 6,680,145 B2 (Obrovac et al.).

Exemplary powdered materials useful for making negative electrodes of his invention include U.S. Pat. No. 6,699,336 B2 (Turner et al.); U.S. Pat. Appl. Publ. No. 2003/0211390 A1 (Dahn et al.); U.S. Pat. Nos. 6,255,017 B1 (Turner) and 6,436,578 B2 (Turner et al.); graphitic carbon that exists in forms such as powders, flakes, fibers or spheres (e.g., mesocarbon microbeads (MCMB)); combinations thereof and other powdered materials that will be familiar to those skilled in the art. Each of the foregoing references is incorporated herein in its entirety.

Powdered alloy particles may include a conductive coating. For example, a particle that contains silicon, copper, and silver or a silver alloy can be coated with a layer of conducting material (e.g., with the alloy composition in the particle core and the conductive material in the particle shell). Suitable conductive materials include, for example, carbon, copper, silver, or nickel.

Exemplary powdered alloy materials can be prepared by any known means, for example, by physically mixing and then milling the various precursor components to the alloys. The mixing can be by simple blending or by using a melt spinning process. According to this process, ingots containing the alloy composition can be melted in a radio frequency field and then ejected through a nozzle onto a surface of a rotating wheel (e.g., a copper wheel). Because the surface temperature of the rotating wheel is substantially lower than the temperature of the melted alloy, contact with the surface of the rotating wheel quenches the melt. Quenching minimizes the formation of large crystallites that can be detrimental to electrode performance. When conductive coatings are employed, they can be formed using techniques such as electroplating, chemical vapor deposition, vacuum evaporation or sputtering. Suitable milling can be done by using various techniques such as vertical ball milling, horizontal ball milling or other milling techniques known to those skilled in the art.

The electrode composition can contain additives such as will be familiar to those skilled in the art. The electrode composition can include an electrically conductive diluent to facilitate electron transfer from the powdered material to a current collector. Electrically conductive diluents include, but are not limited to, carbon (e.g., carbon black for negative electrodes and carbon black, flake graphite and the like for positive electrodes), metal, metal nitrides, metal carbides, metal silicides, and metal borides. Representative electrically conductive carbon diluents include carbon blacks such as SUPER P and SUPER S carbon blacks (both from MMM Carbon, Belgium), SHAWANIGAN BLACK (Chevron Chemical Co., Houston, Tex.), acetylene black, furnace black, lamp black, graphite, carbon fibers and combinations thereof.

The electrode composition can include an adhesion promoter that promotes adhesion of the powdered material or electrically conductive diluent to the binder. The combination of an adhesion promoter and binder can help the electrode composition better accommodate volume changes that can occur in the powdered material during repeated lithiation/delithiation cycles. The disclosed binders can offer sufficiently good adhesion to metals and alloys so that addition of an adhesion promoter may not be needed. If used, an adhesion promoter can be made a part of the lithium polyacrylate binder (e.g., in the form of an added functional group), can be a coating on the powdered material, can be added to the electrically conductive diluent, or can be a combination of such measures. Examples of adhesion promoters include silanes, titanates, and phosphonates as described in U.S. Pat. Appl. Publ. No. 2004/0058240 A1 (Christensen), the disclosure of which is incorporated herein by reference.

The binders of this invention contain lithium polyacrylate. Lithium polyacrylate can be made from poly(acrylic acid) that is neutralized with lithium hydroxide. In this application, poly(acrylic acid) includes any polymer or copolymer of acrylic acid or methacrylic acid or their derivatives where at least about 50 mole %, at least about 60 mole %, at least about 70 mole %, at least about 80 mole %, or at least about 90 mole % of the copolymer is made using acrylic acid or methacrylic acid. Useful monomers that can be used to form these copolymers include, for example, alkyl esters of acrylic or methacrylic acid that have alkyl groups with 1-12 carbon atoms (branched or unbranched), acrylonitriles, acrylamides, N-alkyl acrylamides, N,N-dialkylacrylamides, hydroxyalkylacrylates, and the like. Of particular interest are polymers or copolymers of acrylic acid or methacrylic acid that are water soluble—especially after neutralization or partial neutralization. Water solubility is typically a function of the molecular weight of the polymer or copolymer and/or the composition. Poly(acrylic acid) is very water soluble and is preferred along with copolymers that contain significant mole fractions of acrylic acid. Poly(methacrylic) acid is less water soluble—particularly at larger molecular weights.

Homopolymers and copolymers of acrylic and methacrylic acid that are useful in this invention can have a molecular weight ($M_w$) of greater than about 10,000 grams/mole, greater than about 75,000 grams/mole, or even greater than about 450,000 grams/mole or even higher. The homopolymers and copolymer that are useful in this invention have a molecular weight ($M_w$) of less than about 3,000,000 grams/mole, less than about 500,000 grams/mole, less than about 450,000 grams/mole or even lower. Carboxylic acidic groups on the polymers or copolymers can be neutralized by dissolving the polymers or copolymers in water or another suitable solvent such as tetrahydrofuran, dimethylsulfoxide, N,N-dimethylformamide, or one or more other dipolar aprotic solvents that are miscible with water. The carboxylic acid groups (acrylic acid or methacrylic acid) on the polymers or copolymers can be titrated with an aqueous solution of lithium hydroxide. For example, a solution of 34% poly (acrylic acid) in water can be neutralized by titration with a 20% by weight solution of aqueous lithium hydroxide. Typically, 50% or more, 60% or more, 70% or more, 80% or more, 90% or more, 100% or more, 107% or more of the carboxylic acid groups are lithiated (neutralized with lithium hydroxide) on a molar basis. When more than 100% of the carboxylic acid groups have been neutralized this means that enough lithium hydroxide has been added to the polymer or copolymer to neutralize all of the groups with an excess of lithium hydroxide present.

The binders of this invention may be blended with other polymeric materials to make a blend of materials. This may be done, for example, to increase the adhesion, to provide enhanced conductivity, to change the thermal properties or to affect other physical properties of the binder. The binders of this invention, however, are non-elastomeric. By non-elastomeric it is meant that the binders do not contain substantial amounts of natural or synthetic rubber. Synthetic rubbers include styrene-butadiene rubbers and latexes of styrene-butadiene rubbers. For example, the binders of this invention contain less than 20% by weight, less than 10% by weight, less than 5% by weight, less than 2% by weight, or even less of natural or synthetic rubber.

To make a positive or a negative electrode, the active powdered material, any selected additives such as binders, conductive diluents, fillers, adhesion promoters, thickening agents for coating viscosity modification such as carboxymethylcellulose and other additives known by those skilled in the art are mixed in a suitable coating solvent such as water or N-methylpyrrolidinone (NMP) to form a coating dispersion or coating mixture. The dispersion is mixed thoroughly and then applied to a foil current collector by any appropriate dispersion coating technique such as knife coating, notched bar coating, dip coating, spray coating, electrospray coating, or gravure coating. The current collectors are typically thin foils of conductive metals such as, for example, copper, aluminum, stainless steel, or nickel foil. The slurry is coated onto the current collector foil and then allowed to dry in air followed usually by drying in a heated oven, typically at about 80° C. to about 300° C. for about an hour to remove all of the solvent.

A variety of electrolytes can be employed in the disclosed lithium-ion cell. Representative electrolytes contain one or more lithium salts and a charge-carrying medium in the form of a solid, liquid or gel. Exemplary lithium salts are stable in the electrochemical window and temperature range (e.g. from about −30° C. to about 70° C.) within which the cell electrodes can operate, are soluble in the chosen charge-carrying media, and perform well in the chosen lithium-ion cell. Exemplary lithium salts include $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, and combinations thereof. Exemplary charge-carrying media are stable without freezing or boiling in the electrochemical window and temperature range within which the cell electrodes can operate, are capable of solubilizing sufficient quantities of the lithium salt so that a suitable quantity of charge can be transported from the positive electrode to the negative electrode, and perform well in the chosen lithium-ion cell. Exemplary solid charge carrying media include polymeric media such as polyethylene oxide, polytetrafluoroethylene, polyvinylidene fluoride, fluorine-containing copolymers, polyacrylonitrile, combinations thereof and other solid media that will be familiar to those skilled in the art. Exemplary liquid charge carrying media include ethylene carbonate, propylene carbonate, dimethyl carbonate, diethyl carbonate, ethyl-methyl carbonate, butylene carbonate, vinylene carbonate, fluoroethylene carbonate, fluoropropylene carbonate, γ-butyrlolactone, methyl difluoroacetate, ethyl difluoroacetate, dimethoxyethane, diglyme (bis(2-methoxyethyl) ether), tetrahydrofuran, dioxolane, combinations thereof and other media that will be familiar to those skilled in the art. Exemplary charge carrying media gels include those described in U.S. Pat. No. 6,387,570 (Nakamura et al.) and U.S. Pat. No. 6,780,544 (Noh). The charge carrying media solubilizing power can be improved through addition of a suitable cosolvent. Exemplary cosolvents include aromatic materials compatible with Li-ion cells containing the chosen electrolyte. Representative cosolvents include toluene, sulfolane, dimethoxyethane, combinations thereof and other cosolvents that will be familiar to those skilled in the art. The electrolyte can include other additives that will familiar to those skilled in the art. For example, the electrolyte can contain a redox chemical shuttle such as those described in U.S. Pat. No. 5,709,968 (Shimizu), U.S. Pat. No. 5,763,119 (Adachi), U.S. Pat. No. 5,536,599 (Alamgir et al.), U.S. Pat. No. 5,858,573 (Abraham et al.), U.S. Pat. No. 5,882,812 (Visco et al.), U.S. Pat. No. 6,004,698 (Richardson et al.), U.S. Pat. No. 6,045,952 (Kerr et al.), and U.S. Pat. No. 6,387,571 B1 (Lain et al.); and in U.S. Pat. Appl. Publ. Nos. 2005/0221168 A1, 2005/0221196 A1, 2006/0263696 A1, and 2006/0263697 A1 (all to Dahn et al.).

Electrochemical cells of this invention are made by taking at least one each of a positive electrode and a negative electrode as described above and placing them in an electrolyte. Typically, a microporous separator, such as CELGARD 2400 microporous material, available from Hoechst Celanese, Corp., Charlotte, N.C., is used to prevent the contact of the negative electrode directly with the positive electrode. This is especially important in coin cells such as, for example, 2325 coin cells as known in the art.

Electrochemical cells made with the negative electrodes of this invention showed reduced irreversible capacity loss and less fade than similar cells containing negative electrodes with conventional binders.

The disclosed cells can be used in a variety of devices, including portable computers, tablet displays, personal digital assistants, mobile telephones, motorized devices (e.g., personal or household appliances and vehicles), instruments, illumination devices (e.g., flashlights) and heating devices. One or more electrochemical cells of this invention can be combined to provide battery pack. Further details regarding the construction and use of rechargeable lithium-ion cells and battery packs will be familiar to those skilled in the art.

The invention is further illustrated in the following illustrative examples, in which all parts and percentages are by weight percent (wt %) unless otherwise indicated.

EXAMPLES

Preparatory Example 1

Preparation of $Si_{70}Fe_{10}Ti_{10}C_{10}$ Alloy $Si_{70}Fe_{10}Ti_{10}$ was prepared by melting silicon lumps (65.461 grams)(Alfa Aesar/99.999%, Ward Hill, Miss.), iron pieces (18.596 grams) (Alfa Aesar/99.97%) and titanium sponge (15.943 grams) (Alfa Aesar/99.7%) in an ARC furnace. The alloy ingot of $Si_{70}Fe_{10}Ti_{10}$ was broken into small chinks and was treated in a hammer mill to produce alloy powder particles of approximately 150 micrometers.

$Si_{70}Fe_{10}Ti_{10}C_{10}$ alloy was made from $Si_{70}Fe_{10}Ti_{10}$ alloy powder (described above) and graphite (TIMREX SFG44, TimCal Ltd., Bodio, Switzerland) by reactive ball milling in a high kinetic ball mill (SIMOLOYER, CM20-201m, Zoz GmbH, Wenden, Germany). A sample of 1.4423 kg of $Si_{70}Fe_{10}Ti_{10}$ alloy powder, 0.0577 kg graphite and 25 kg of 4.76 millimeter diameter chromium-steel balls were charged to the mill. The mill was operated for 180 cycles where each cycle consisted of 45 seconds at 550 revolutions per minutes (rpm) and then 15 seconds at 300 rpm. The total milling time was 3 hours. The mill was cooled by chilled water during the milling.

Preparatory Example 2

Preparation of Lithium Polyacrylate

Lithium polyacrylate was made by adding an aqueous solution of lithium hydroxide solution to an aqueous poly (acrylic acid) solution. Different molar ratios of lithium hydroxide and carboxylic acid groups were used. Typically a 20 wt % aqueous solution of lithium hydroxide and a 34 wt % aqueous solution of poly(acrylic acid) were used. De-ionized water was added to bring the final solution of lithium polyacrylate to 10 wt % solids. Poly(acrylic acid) of 100,000 ($M_w$) and 250,000 ($M_w$) were obtained as aqueous solutions from Aldrich Chemicals, Milwaukee, Wis. Samples of 65% LiOH neutralized lithium polyacrylate, of both 100,000 $M_w$ and 250,000 $M_w$, were prepared by adding 185.56 grams of de-ionized water and 60.41 grams of 20% lithium hydroxide solution and 100 grams poly(acrylic acid) (PAA) solution (34 wt % in water). The results were 10% solids solutions of lithium polyacrylate which had been 64% neutralized. The two samples were designated lithium (64%) polyacrylate PAA100k-64% Li salt and lithium (64%) polyacrylate PAA250k-64% Li salt.

Additional samples of 107% of neutralized lithium polyacrylate were prepared using both the 100,000 $M_w$ and the 250,000 $M_w$ polymer by adding 149.01 grams of de-ionized water and 106.01 grams of 20% lithium hydroxide solution to 100 grams poly(acrylic acid) solution (34 wt % in water). The results were 10% solids solutions of lithium polyacrylate with a 7 mole % excess of lithium hydroxide. The two samples were designated lithium (107%) polyacrylate PAA100k-107% Li Salt and lithium (107%) polyacrylate PAA250k-107% LI salt.

TABLE 1

Calculated Weight % of total, dried coating

| | Example | | | | | | | | | |
|---|---|---|---|---|---|---|---|---|---|---|
| | 1 | 2 | 3 | 4 | 5 | 6 | 7 | 8 | 9 | 10 |
| $Si_{70}Fe_{10}Ti_{10}C_{10}$ | 60 | 92 | 60 | 92 | — | — | 92 | — | 5 | 47.5 |
| 65 wt % $Si_{70}Fe_{10}Ti_{10}C_{10}$: 35 wt % SLP30 | — | — | — | — | — | 92 | — | — | — | — |
| MCMB 1028 | 32 | — | — | — | — | — | — | — | — | — |
| MCMB 6-28 | — | — | — | — | — | — | — | — | 90 | — |
| SFG44 | — | — | — | — | — | — | — | — | — | 47.5 |
| KETJEN Black | 1.2 | 1.2 | — | — | — | — | — | — | — | — |
| PAA100k-64% Li salt | 6.8 | 6.8 | — | — | — | — | — | — | — | — |
| SLP30 | — | — | 32 | — | 95 | — | — | 95 | — | — |
| PAA100k-107% Li salt | — | — | 8 | 8 | 5 | — | — | — | — | — |
| PAA250k-107% Li salt | — | — | — | — | — | 8 | 8 | 5 | — | — |
| KYNAR 741 | — | — | — | — | — | — | — | — | 5 | 5 |
| Die Gap for coating (μm) | 125 | 75 | 125 | 75 | 125 | 75 | 75 | 75 | 250 | 250 |

Electrode Fabrication

Example 1

KETJEN Black conductive carbon (0.024 g) (Akzo Nobel Polymer Chemical LLC, Chicago, Ill.) and PAA100k-64% Li salt (1.36 g of a 10% solids solution in water, were mixed in a 45-mL stainless steel vessel using four 13 micrometer diameter tungsten carbide balls. The mixing was carried out in a planetary micro mill (PULVERSETTE 7 Model; Fritsch, Germany) at a speed setting of 1 for 30 minutes. Then $Si_{70}Fe_{10}Ti_{10}C_{10}$ powder (1.20 g), MCMB-1028 graphite (0.64 g) (MMM Carbon, Belgium) and de-ionized water (0.1 g) were added to the mill and the mixing was continued at a speed setting of 2 for 30 minutes. The resulting solution was coated onto a 13-micron thick Cu foil using a die with a 125 μm gap. The sample was then dried in a vacuum oven at 120° C. for 2 hours.

Example 2

An electrode based on the composition of Example 2 in Table 1 was prepared by the procedure used for Example 1 except that only 1.84 grams of $Si_{70}Fe_{10}Ti_{10}C_{10}$ powder was added to the milled conductive carbon and polymer mixture. The milled coating solution was coated onto copper foil using a 75 μm gap.

Example 3

An electrode based on the composition of Example 3 in Table 1 was prepared by the procedure used for Example 1 except that $Si_{70}Fe_{10}Ti_{10}C_{10}$ powder (1.20 g), SLP30-Graphite (0.64 g) (TIMREX SLP30, TimCal Ltd., CH-6743 Bodio, Switzerland), de-ionized water (1.0 g) and PAA100k-107% Li salt (1.6 g of a 10% solids solution in water) were milled in a single step at a speed setting of 2 for 30 minutes. The milled solution was spread onto the copper foil using a 3 μm gap.

Example 4

An electrode based on the composition of Example 4 of Table 1 was prepared by the same procedure used for Example 3, except that only 0.2 grams of de-ionized water was added. The milled solution was spread onto the copper foil using a 3 mil gap.

Example 5

An electrode based on the composition of Example 5 of Table 1 was prepared by the same procedure used for Example 3, except that 2.5 grams of de-ionized water was used with the graphite and the poly(acrylic acid) in the milling step. The milled solution was spread onto the copper foil using a 3 mil gap.

Examples 6 and 7

Electrodes based on the compositions of Example 6 and Example 7 of Table 1 were prepared by the same procedure used for Example 4.

Example 8

An electrode based on the composition of Example 8 in Table 1 was prepared by the same procedure used for Example 5.

Comparative Example 1

Graphite (1.00 gram) (MCMB, Grade 6-28, Osaka Gas Co. Osaka-Shi, Japan), $Si_{70}Fe_{10}Ti_{10}C_{10}$ (0.1 gram), polyvinylidene fluoride (KYNAR 741) solution (1.0 gram of a 10% by weight solution in N-methylpyrrolidinone (NMP)), and NMP (2.5 grams) were mixed in planetary micro mill as described for Example 1. The mixture was coated and dried as in Example 1.

Comparative Example 2

$Si_{70}Fe_{10}Ti_{10}C_{10}$ powder (2.0 grams) and TIMREX SFG44 graphite (2.0 grams) were mixed in the micro mill used for Example 1 at a speed setting of 7 for 30 minutes. This mixture (1.90 grams), polyvinylidene fluoride (KYNAR 741) solution (1.0 grams) and NMP (3.0 grams) were mixed in the micro mill of Example 1 at a speed setting of 2 for one hour. The mixture was coated and dried as in Example 1.

Test Cell Assembly

Disks (16-mm diameter) were cut from the electrode coatings for use in 2325-button cells. Each 2325 cell contains a 18 mm diameter disk of Cu as a spacer (36-mil (900 μm) thick), an 18 mm diameter disk of the alloy electrode, one 20 mm diameter microporous separator (CELGARD 2400; Separation Products, Hoechst Celanese Corp., Charlotte, N.C. 28273)), 18 mm diameter lithium (0.38 mm thick lithium ribbon; Aldrich Chemicals, Milwaukee, Wis.) and an 18 mm diameter copper spacer (600 μm thick). One hundred microliters of electrolyte solution (IM $LiPF_6$ in 90 wt % ethylene carbonate (EC):diethylene carbonate (DEC) (1:2 v/v) (Ferro Chemicals (Zachary, La.); 10 wt % fluoroethylene carbonate (FEC) (Fujian Chuangxin Science and Technology Development, LTP, Fujian, China)) were mixed and used as the electrolyte. The electrolyte mixture was dried over molecular sieves (3A type) over 12 hrs. The coin cells were charged and discharged from 0.005V to 0.90V with a constant current of 250 mA/g for alloy and alloy/graphite electrodes and with a constant current of 100 mA/g for graphite electrodes. During charging, when the cell reached 0.90V, the cell voltage was held constant and the charging continued until the current reached 10 mA/g. The cell was allowed to remain at open circuit for fifteen minutes at the end of every half cycle.

The initial charge capacity of each cell was calculated from the measured total milliamp-hours charged until the cell voltage reached 0.005V. The cell was then discharged as described above. The irreversible capacity loss (shown in Table 2) was calculated from the difference between the initial charge capacity and the first discharge capacity divided by the initial capacity times 100. The data in Table 2 show that negative electrodes made using the binders of this invention have less irreversible capacity loss compared with electrodes made with polyvinylidene fluoride binders.

TABLE 2

Initial Charge Capacity and Irreversible Capacity of Examples 1-8

| | Initital Charge Capacity (mAh/g Active Material) | Irreversible Capacity Loss (%) |
|---|---|---|
| Example 1 | No Data | No Data |
| Example 2 | No Data | No Data |
| Example 3 | 982 | 10.0 |
| Example 4 | 1339 | 10.4 |
| Example 5 | 392 | 8.7 |
| Example 6 | 987 | 9.8 |
| Example 7 | 1339 | 9.6 |

TABLE 2-continued

Initial Charge Capacity and Irreversible Capacity of Examples 1-8

| | Initital Charge Capacity (mAh/g Active Material) | Irreversible Capacity Loss (%) |
|---|---|---|
| Example 8 | 397 | 8.3 |
| Comparative Example 1 | 388 | 15.7 |
| Comparative Example 2 | 819 | 19.3 |

The discharge capacity after cycle 5 and after cycle 50 for each cell is provided in Table 3. The data show that cells containing negative electrodes with binders of this invention have less fade after 50 cycles than those made with polyvinylene fluoride binders.

TABLE 3

Discharge Capacity at Cycle 5 and at Cycle 50 for Examples 1-8

| | Discharge Capacity at Cycle 5 (mAh/g Alloy and graphite) | Discharge Capacity at Cycle 50 (mAh/g Alloy and graphite) | % Capacity Loss/ Cycle |
|---|---|---|---|
| Example 1 | 864 | 854 | 0.026 |
| Example 2 | 1219 | 1179 | 0.073 |
| Example 3 | 891 | 862 | 1.072 |
| Example 4 | 1190 | 1134 | 0.105 |
| Example 5 | 363 | 362 | 0.006 |
| Example 6 | 897 | 847 | 0.012 |
| Example 7 | 1219 | 1138 | 0.144 |
| Example 8 | 365 | 366 | — |
| Comparative Example 1 | 311 | 289* | 0.157 |
| Comparative Example 2 | 451 | 136 | 1.550 |

*Comparative Example 1 Discharge Capacity at Cycle 19

A number of embodiments of the invention have been described. Nevertheless, it will be understood that various modifications can be made without departing from the spirit and scope of the invention. Accordingly, other embodiments are within the scope of the following claims.

I claim:

1. An electrode composition comprising:
a powdered active material capable of undergoing lithiation and delithiation; and
a non-elastomeric binder comprising lithium polyacrylate, wherein the powdered active material comprises metallic silicon or an alloy of silicon, and wherein the amount of lithium polyacrylate is from 5 to less than 20 percent by weight of the weight of the total composition and wherein the lithium polyacrylate has a molecular weight of between about 75,000 grams/mole and about 500,000 grams/mole.

2. The composition of claim 1, wherein the powdered material further comprises a material selected from silver, tin, bismuth, carbon, lead, antimony, germanium, zinc, gold, platinum, palladium, arsenic, aluminum, gallium, indium, thallium, molybdenum, niobium, tungsten, tantalum, iron, copper, titanium, vanadium, chromium, nickel, cobalt, zirconium, yttrium, a lanthanide, an actinide, and combinations thereof.

3. The composition of claim 1, wherein the powdered material further comprises iron, carbon, and titanium.

4. The composition of claim 3, wherein the powdered material comprises from about 65 to about 85 mole percent silicon, from about 5 to about 12 mole percent iron, from about 5 to about 12 mole percent titanium, and from about 5 to about 12 mole percent carbon.

5. The composition of claim 1, wherein the powdered material further comprises graphitic carbon.

6. An electrochemical cell comprising:
a positive electrode;
a negative electrode; and
an electrolyte,
wherein at least one of the positive electrode or the negative electrode comprises a
powdered active material capable of undergoing lithiation and delithiation, and
a non-elastomeric binder comprising lithium polyacrylate, wherein the powdered active material comprises metallic silicon or an alloy of silicon, and wherein the amount of lithium polyacrylate is from 5 to less than 20 percent by weight of the weight of the total composition and wherein the lithium polyacrylate has a molecular weight of between about 75,000 grams/mole and about 500,000 grams/mole.

7. The cell of claim 6, wherein the cell further comprises a secondary electrochemical cell.

8. The cell of claim 6, wherein the negative electrode comprises a silicon alloy.

9. The cell of claim 8, wherein the alloy further comprises iron, carbon, and titanium.

10. The cell of claim 6, wherein the negative electrode further comprises graphitic carbon.

11. A battery pack comprising at least one cell according to claim 6.

12. A method of making an electrochemical cell electrode comprising:
providing a current collector;
providing a powdered active material capable of undergoing lithiation and delithiation; and
applying to the current collector a coating that comprises the powdered active material and lithium polyacrylate, wherein the powdered active material comprises metallic silicon or an alloy of silicon, and wherein the amount of lithium polyacrylate is from 5 to less than 20 percent by weight of the weight of the total composition and wherein the lithium polyacrylate has a molecular weight of between about 75,000 grams/mole and about 500,000 grams/mole.

13. The method of claim 12 wherein applying the coating further comprises:
mixing the powdered material with a solution of lithium polyacrylate to form a dispersion;
milling the dispersion to form a coatable mixture;
coating the mixture onto the current collector; and
drying the coated current collector.

* * * * *

UNITED STATES PATENT AND TRADEMARK OFFICE
CERTIFICATE OF CORRECTION

PATENT NO. : 7,875,388 B2
APPLICATION NO. : 11/671601
DATED : January 25, 2011
INVENTOR(S) : Dinh B Le Page 1 of 1

It is certified that error appears in the above-identified patent and that said Letters Patent is hereby corrected as shown below:

Column 4,
Line 41, delete "SHAWANIGAN" and insert --SHAWINIGAN-- therefor.

Column 6,
Line 36, delete "butylrolactone," and insert --butyrolactone,-- therefor.

Column 9,
Line 10, delete "PULVERSETTE" and insert --PULVERISETTE-- therefor.

Column 10,
Line 31, delete "(IM" and insert --(1M-- therefor.

Column 10,
Line 59, delete "Initital" and insert --Initial-- therefor.

Column 11,
Line 5, delete "Initital" and insert --Initial-- therefor.

Column 11,
Line 52, in Claim 1, after "composition" insert --,-- therefor.

Column 12,
Line 25, in Claim 6, after "composition" insert --,-- therefor.

Column 12,
Line 48, in Claim 12, after "composition" insert --,-- therefor.

Signed and Sealed this
Twenty-ninth Day of May, 2012

David J. Kappos
*Director of the United States Patent and Trademark Office*